(12) United States Patent
Lee et al.

(10) Patent No.: US 7,268,792 B2
(45) Date of Patent: Sep. 11, 2007

(54) METHOD AND APPARATUS FOR RENDERING IMAGE SIGNAL

(75) Inventors: Seong-deok Lee, Kyungki-do (KR); Chang-yeong Kim, Kyungki-do (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 996 days.

(21) Appl. No.: 10/429,713

(22) Filed: May 6, 2003

(65) Prior Publication Data

US 2004/0114046 A1    Jun. 17, 2004

(30) Foreign Application Priority Data

Dec. 17, 2002    (KR)    ............... 10-2002-0080879

(51) Int. Cl.
*G09G 5/02*    (2006.01)
(52) U.S. Cl. ............... 345/694; 345/690; 345/88
(58) Field of Classification Search ............... None
See application file for complete search history.

(56) References Cited

U.S. PATENT DOCUMENTS

| | | | | |
|---|---|---|---|---|
| 4,800,375 A | * | 1/1989 | Silverstein et al. | ......... 345/694 |
| 4,991,122 A | * | 2/1991 | Sanders | ............... 345/698 |
| 6,388,644 B1 | | 5/2002 | De Zwart et al. | |

FOREIGN PATENT DOCUMENTS

| EP | 0 778 696 A2 | 6/1997 |
|---|---|---|
| JP | 2002-191055 | 7/2002 |

OTHER PUBLICATIONS

Cited in the attached Korean Office Action (with English translation) dated Nov. 17, 2004.
European Search Report dated Jan. 10, 2006.

* cited by examiner

*Primary Examiner*—Mark Zimmerman
*Assistant Examiner*—Kevin Xu
(74) *Attorney, Agent, or Firm*—Buchanan Ingersoll & Rooney PC

(57) ABSTRACT

A method and apparatus for rendering an image signal by adding another one color different from an inputted color, to an image signal composed of a predetermined number (for example, RGB) of components, is provided. The method for rendering image signals which represent a predetermined number of colors in an apparatus for rendering an image signal of which pixels have three sub-pixels, comprises (a) receiving a predetermined number of color signals and converting the predetermined number of color signals into four-color signals to be represented in the sub-pixels, (b) selecting two-color signals to be outputted alternatively in every other pixels out of the four-color signals and selecting only one-color signal for each position of a pixel area from the two-color signal, (c) recalculating a level value of the selected one-color signal to be represented in the sub-pixels, and (d) controlling image signals to be represented in the sub-pixels according to the level value of the one-color signal calculated in (c).

28 Claims, 14 Drawing Sheets

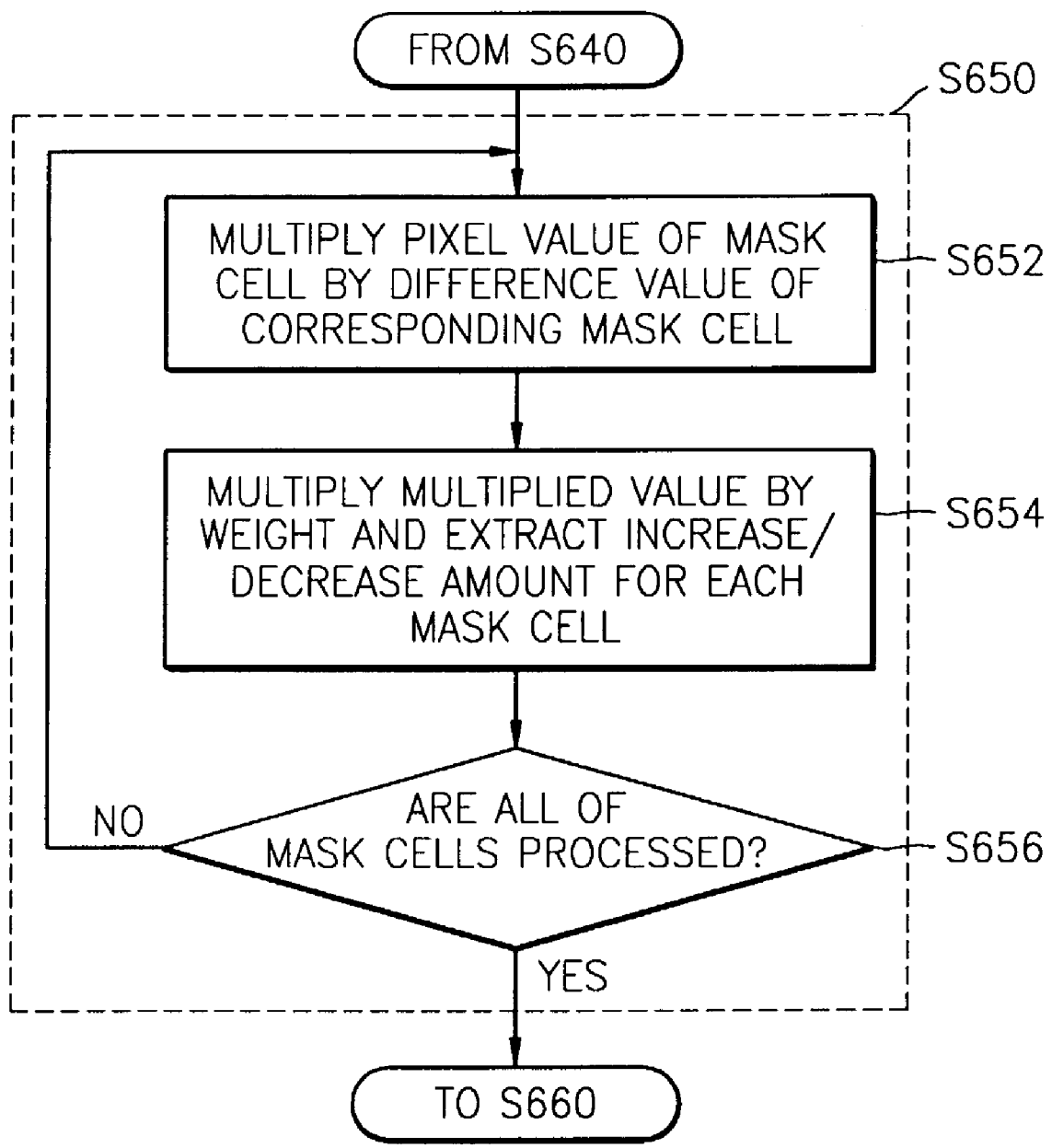

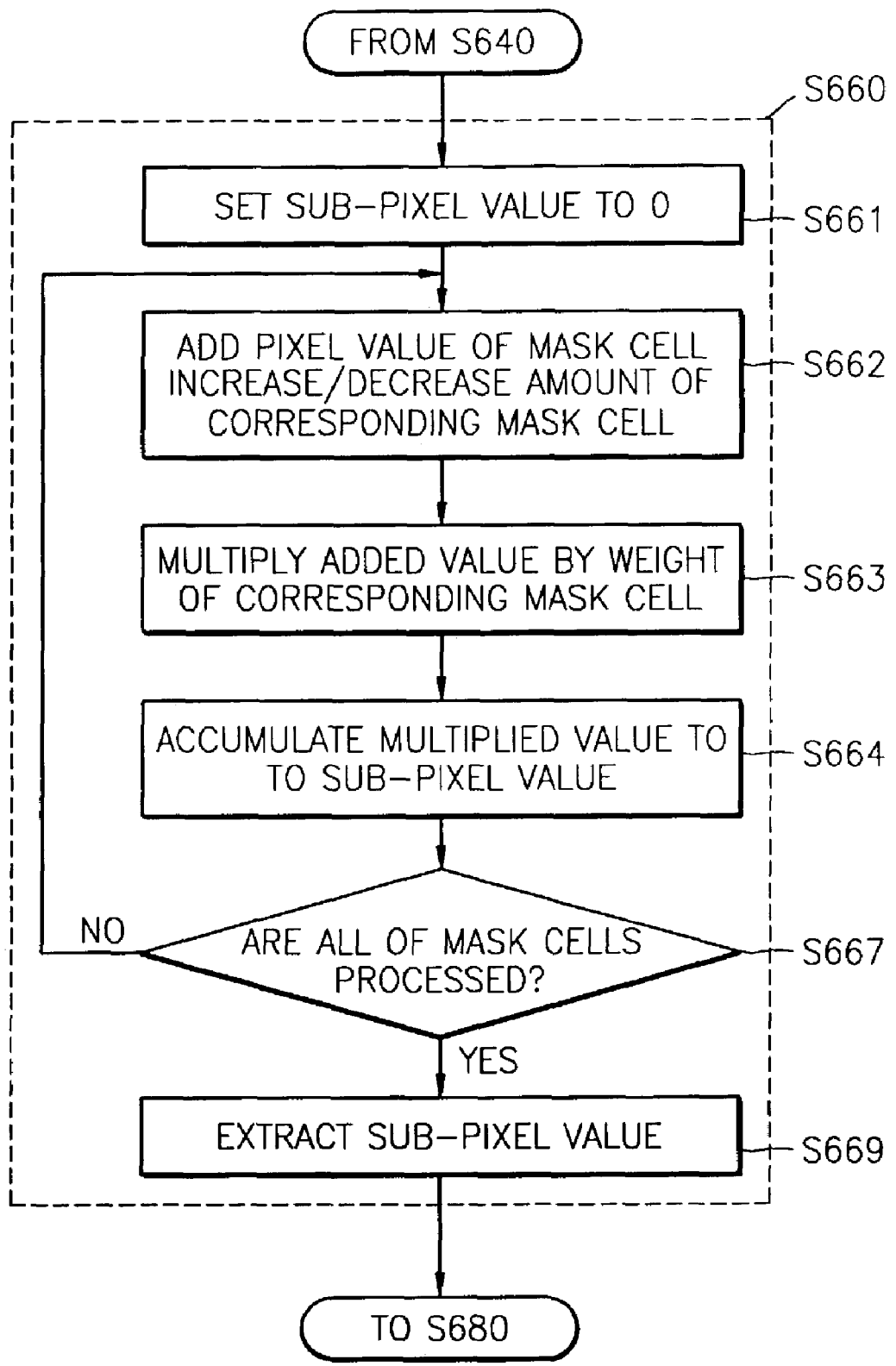

FIG. 7

|  | col-1 | col-2 | col-3 | col-4 |
|---|---|---|---|---|
| Row-1 | C1 C2 C3 | C1 C2 C4 | C1 C2 C3 | C1 C2 C4 |
| Row-2 | C1 C2 C3 | C1 C2 C4 | C1 C2 C3 | C1 C2 C4 |
| Row-3 | C1 C2 C3 | C1 C2 C4 | C1 C2 C3 | C1 C2 C4 |
| Row-4 | C1 C2 C3 | C1 C2 C4 | C1 C2 C3 | C1 C2 C4 |

FIG. 8

|  | col-1 | col-2 | col-3 | col-4 |
|---|---|---|---|---|
| Row-1 | C1 C2 C3 | C1 C2 C4 | C1 C2 C3 | C1 C2 C4 |
| Row-2 | C1 C2 C4 | C1 C2 C3 | C1 C2 C4 | C1 C2 C3 |
| Row-3 | C1 C2 C3 | C1 C2 C4 | C1 C2 C3 | C1 C2 C4 |
| Row-4 | C1 C2 C4 | C1 C2 C3 | C1 C2 C4 | C1 C2 C3 |

FIG. 9

|  | col-1 | col-2 | col-3 | col-4 |
|---|---|---|---|---|
| Row-1 | C1 C3 C2 | C1 C4 C2 | C1 C3 C2 | C1 C4 C2 |
| Row-2 | C2 C4 C1 | C2 C3 C1 | C2 C4 C1 | C2 C3 C1 |
| Row-3 | C1 C3 C2 | C1 C4 C2 | C1 C3 C2 | C1 C4 C2 |
| Row-4 | C2 C4 C1 | C2 C3 C1 | C2 C4 C1 | C2 C3 C1 |

FIG. 10

|  | col-1 | col-2 | col-3 | col-4 |
|---|---|---|---|---|
| Row-1 | C1 C3 C2 | C1 C3 C2 | C1 C3 C2 | C1 C3 C2 |
| Row-2 | C2 C4 C1 | C2 C4 C1 | C2 C4 C1 | C2 C4 C1 |
| Row-3 | C1 C3 C2 | C1 C3 C2 | C1 C3 C2 | C1 C3 C2 |
| Row-4 | C2 C4 C1 | C2 C4 C1 | C2 C4 C1 | C2 C4 C1 |

FIG. 11A

| m11 | m12 | m13 |
|-----|-----|-----|
| m21 | m22 | m23 |
| m31 | m32 | m33 |

FIG. 11B

| m11 | m12 | m13 | m14 | m15 |
|-----|-----|-----|-----|-----|
| m21 | m22 | m23 | m24 | m25 |
| m31 | m32 | m33 | m34 | m35 |
| m41 | m42 | m43 | m44 | m45 |
| m51 | m52 | m53 | m54 | m55 | ved to be read and verified carefully.

METHOD AND APPARATUS FOR RENDERING IMAGE SIGNAL

This application claims the priority of Korean Patent Application No. 2002-80879, filed on Dec. 17, 2002, in the Korean Intellectual Property Office, the disclosure of which is incorporated herein in its entirety by reference.

BACKGROUND OF THE INVENTION

1. Field of the Invention

The present invention relates to a method and apparatus for rendering an image signal using a multicolored image signal rendering apparatus, and more particularly, a method and apparatus for rendering an image signal by adding a fourth color component, to an image signal composed of three colors (for example, RGB).

2. Description of the Related Art

In a conventional apparatus for rendering an image signal, a pixel is composed of sub-pixels having three different colors, for example, red (R), green (G), and blue (B). FIG. 1 shows an example of a filter arrangement of an RGB-striped structure.

FIG. 2 shows an example of an RGBW filter structure of a conventional RGBW type apparatus for rendering an image signal in which luminance is improved by adding a fourth color sub-pixel (for example, white) to sub-pixels representing RGB colors. In methods for rendering a four-channel image signal by which white or a certain primary color is added to three RGB channels as shown in FIG. 2, when the added primary color is white, an output light of the primary color can be increased, and when the added primary color is a primary color excluding RGB colors, a renderable color area can be enlarged.

In the case of the RGBW filter shown in FIG. 2, if the same pixel area is used simultaneously, due to a high transmittance of a white filter, the output light of the pixel can be increased. However, since one white filter is added to each pixel, the sizes of RGB filters become smaller compared to a pixel in which only three RGB colors are used as shown in FIG. 1. As such, the output light of RGB primary colors becomes rather reduced compared to the pixel in which only three RGB sub-pixels are used. Also, since driver integrated circuits (ICs) for driving the white filter are needed, manufacturing costs of these filters increase.

FIG. 3 shows another example of an RGBW filter structure of a conventional RGBW type apparatus for rendering an image signal in which luminance is improved by adding a fourth color sub-pixel (for example, white) to sub-pixels of GB colors. Here, although pixel is composed of 2×2 sub-pixels, the same problems as in the RGBW filters shown in FIG. 2 occur.

Figure 4:
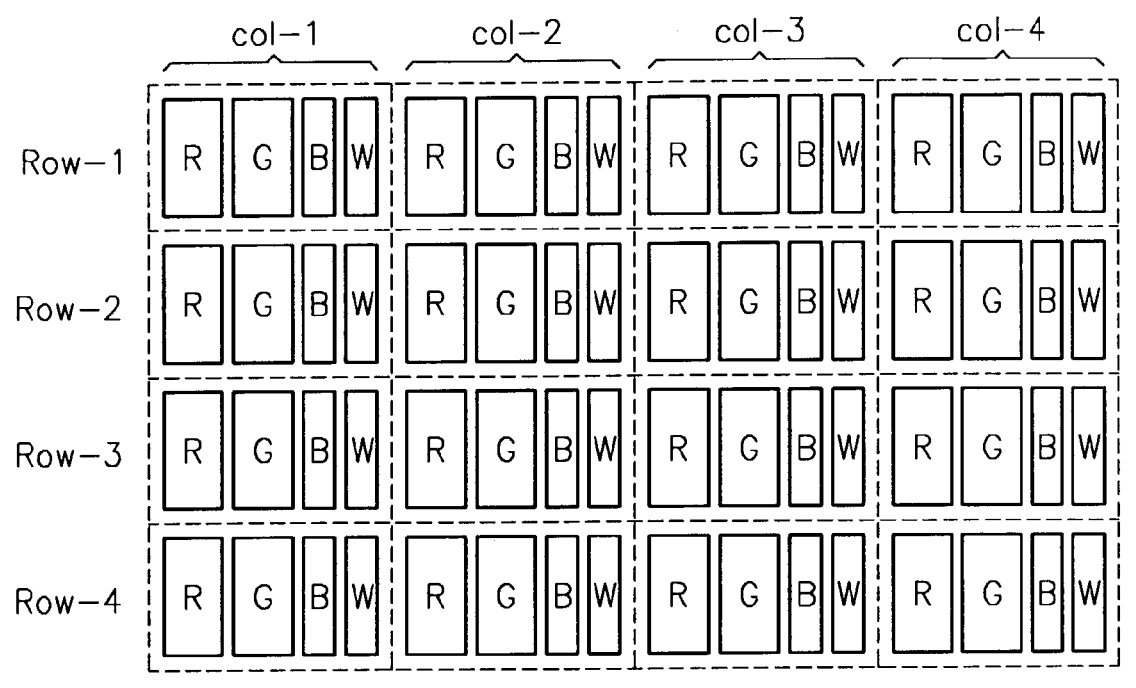

FIG. 4 shows still another example of an RGBW filter structure of a conventional RGBW type apparatus for rendering an image signal in which luminance is improved by adding a fourth color sub-pixel (for example, white) to sub-pixels of RGB colors. There is only one difference from the RGBW filter structure shown in FIG. 2, i.e., the sizes of blue and white filters are small and the sizes of red and green filters are the same as the sizes of sub-pixels of R and G colors at a pixel in which only three RGB colors are used. Thus, with an output light increase caused by the white filter, an output light decrease of primary colors such as red and green can be prevented. However, since the driver ICs for driving the white filter are additionally required, the manufacturing costs in this case increase as well.

SUMMARY OF THE INVENTION

The present invention provides a method and apparatus for rendering an image signal in which an output light decrease of primary colors such as red (R), green (G), and blue (B) is minimized, additional driver integrated circuits (ICs) for driving a fourth color filter are not needed, and an original image signal composed of three RGB primary colors is rendered as a signal composed of four primary colors.

According to an aspect of the present invention, there is provided a method for rendering image signals which represent a predetermined number of colors in an apparatus for rendering an image signal of which pixels have three sub-pixels. The method comprises (a) receiving a predetermined number of color signals and converting the predetermined number of color signals into four-color signals to be represented in the sub-pixels, (b) selecting two-color signals to be outputted alternatively in every other pixels out of the four-color signals and selecting only one-color signal for each position of a pixel area from the two-color signal, (c) recalculating a level value of the selected one-color signal to be represented in the sub-pixels, and (d) controlling image signals to be represented in the sub-pixels according to the level value of the one-color signal calculated in (c).

Preferably, in (c), the level value of the one-color signal selected in (b) is calculated according to peripheral sub-pixel values using a mask having a size corresponding to the size of each pixel of the apparatus for rendering an image signal and composed of a predetermined number of cells.

Preferably, (c) comprises (c1) calculating a difference value for each mask cell, (c2) calculating an increase/decrease amount of a pixel value using a pixel value and a difference value for each mask cell, and (c3) calculating a pixel value of an entire mask cell using the pixel value for each mask and the increase/decrease amount of the pixel value for each mask cell.

According to another aspect of the present invention, there is provided an apparatus for rendering an image signal of which pixels have three sub-pixels. The apparatus includes a signal conversion unit to receive a predetermined number of color signals and convert the predetermined number of color signals into four-color signals, a signal selection unit to select two-color signals to be outputted alternatively in every other pixels out of the four-color signals and select only one-color signal for each position of a pixel area from the two-color signal, a level value recalculation unit to recalculate a level value of the selected one-color signal to be represented in the sub-pixels, and a display driver to control image signals to be represented in the sub-pixels according to sub-pixel values received from the level value recalculation unit.

Preferably, the level value recalculation unit includes a difference value calculation part to calculate a difference value for each mask cell, an increase/decrease calculation part to calculate an increase/decrease amount of a pixel value using the pixel value and the difference value for each mask cell, and a sub-pixel value calculation part to calculate a sub-pixel value of an entire mask cell using the pixel value for each mask cell and the increase/decrease amount of the pixel value for each mask cell.

BRIEF DESCRIPTION OF THE DRAWINGS

The above and other aspects and advantages of the present invention will become more apparent by describing in detail preferred embodiments thereof with reference to the attached drawings in which:

FIG. 1 shows an example of a filter arrangement of an RGB-striped structure;

FIGS. 2 through 4 show examples of an RGBW filter structure of a conventional RGBW type apparatus for rendering an image signal in which luminance is improved by adding a fourth color sub-pixel (for example, white) to sub-pixels of RGB colors;

FIGS. 6C through 6F are detailed flowcharts illustrating the step of recalculating a sub-pixel signal value performed in the level value recalculation part 516;

FIGS. 7 through 10 show examples of a four-color (C1, C2, C3, and C4) filter structure according to an embodiment of the present invention;

FIGS. 11A and 11B show the structure of a mask according to an embodiment of the present invention;

DETAILED DESCRIPTION OF THE INVENTION

Hereinafter, preferred embodiments of the present invention will be described in detail, examples of which are illustrated in the accompanying drawings.

Figure 3:
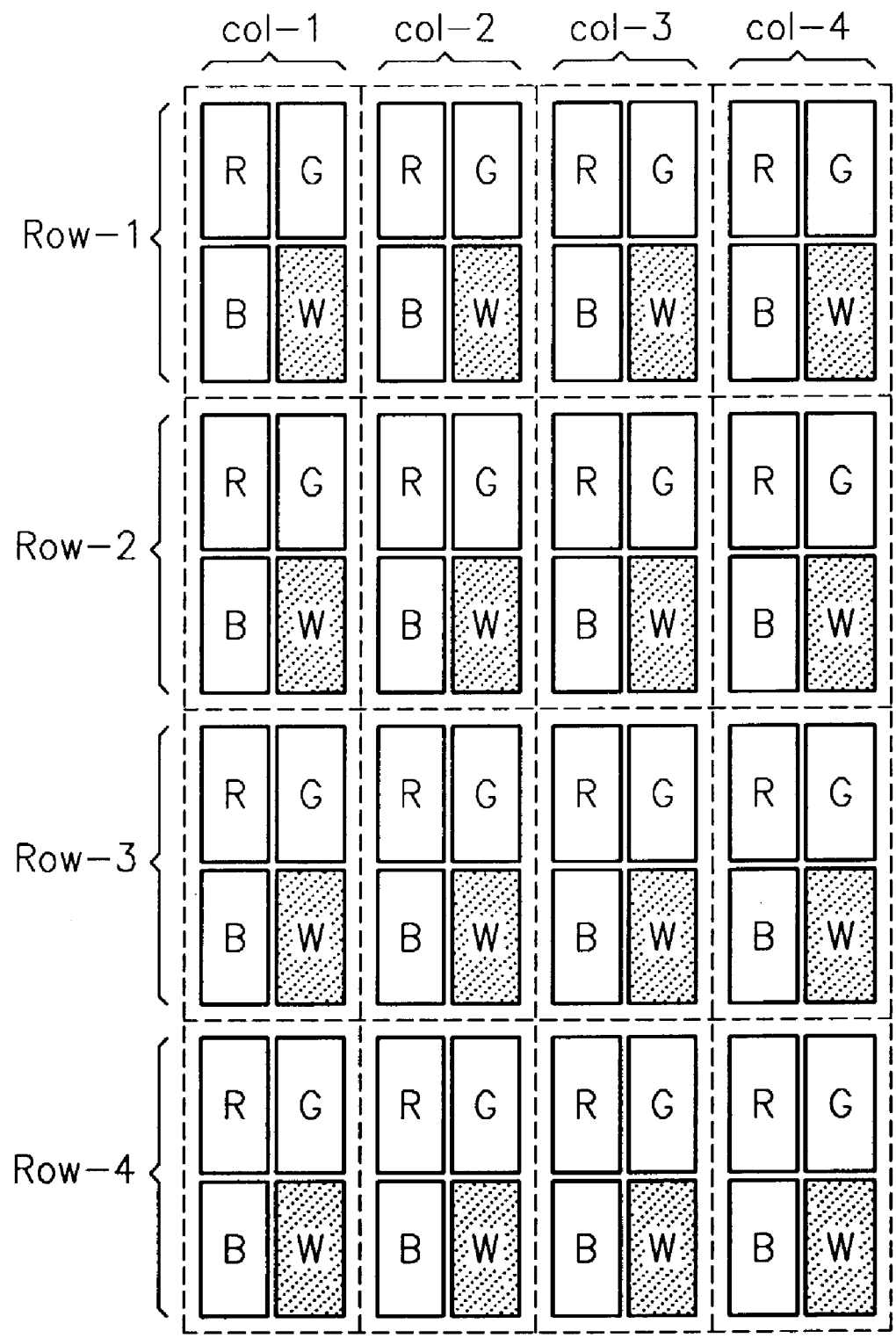
Figure 5A:
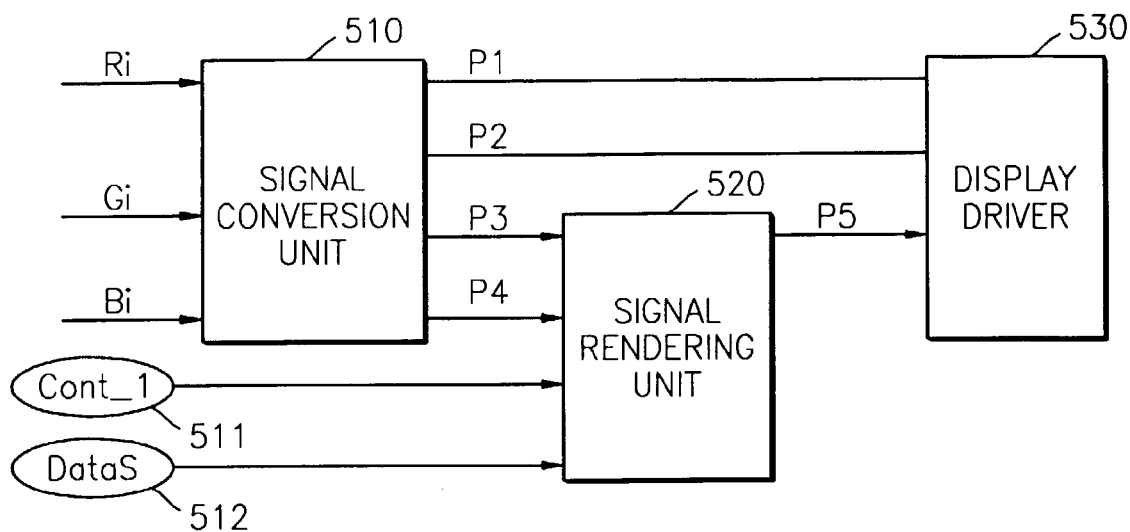
FIG. 5A is a block diagram illustrating the structure of an apparatus for rendering an image signal according to an embodiment of the present invention.
Figure 6A:
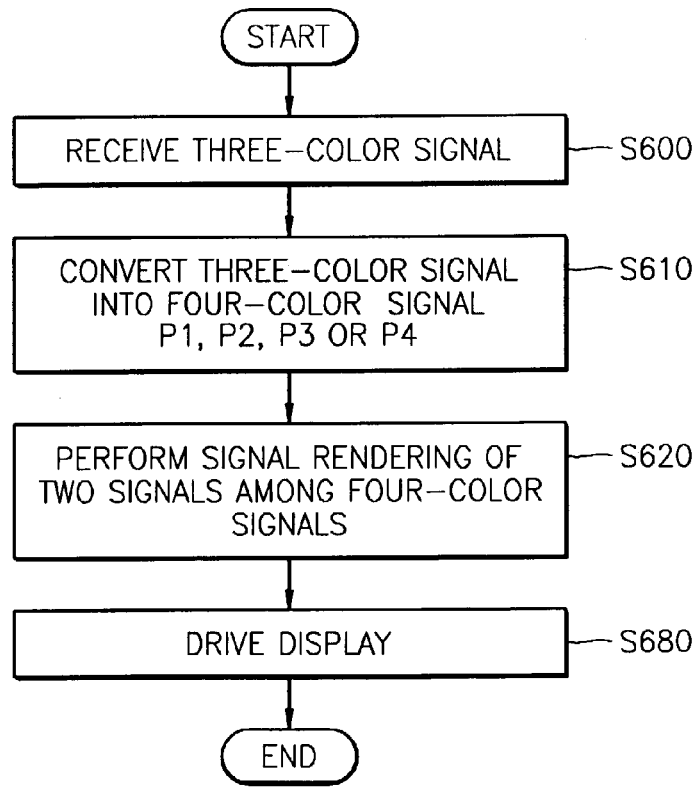
FIG. 6A is a flowchart illustrating a method for rendering an image signal performed in the apparatus for rendering an image signal according to an embodiment of the present invention.

FIG. 5A is a block diagram illustrating the structure of an apparatus for rendering an image signal according to a preferred embodiment of the present invention, and FIG. 6A is a flowchart illustrating a method for rendering an image signal performed in the apparatus for rendering an image signal according to a preferred embodiment of the present invention.

The apparatus for rendering an image signal includes a signal conversion unit 510, a signal rendering unit 520, and a display driver 530.

The signal conversion unit 510 receives three primary color image data Ri, Gi, and Bi to be displayed (S600) and generates four primary color signals P1, P2, P3, and P4.

Here, P1, P2, and P3 may respectively be R, G, and B colors, while the fourth primary color signal P4 is different from the P1, P2, and P3 color signals, and may be, for example, white, yellow, or cyan.

Methods for converting a three-color (for example, RGB) signal into a four-color signal by adding one primary color and preventing a color change which may occur when a certain primary color is added to sub-pixels of three primary colors, have been intensively studied. According to theses methods, an RGBW four channel signal is generated by extracting a W signal from sub-pixels of RGB colors and updating a corresponding RGB signal using the extracted W signal. The signal conversion unit 510 converts a three-color (for example, RGB) signal into a four-color (for example, RGBW) signal using a variety of existing signal converting methods (S610). The signal rendering unit 520 receives P3 and P4 signals among the four-channel signals P1, P2, P3, and P4 from the signal conversion unit 510, and simultaneously, receives a signal Cont_1 511 which indicates an image coordinate of a corresponding signal, and a data signal DataS 512 which indicates a level value of a corresponding channel in the vicinity of a corresponding coordinate, calculates a level value of a sub-pixel to be rendered in an apparatus for rendering an image signal, and outputs the calculated level value to the display driver 530 (S620). Here, an outputted signal P5 is a level value obtained by recalculating the signals P3 or P4.

The display driver 530 receives the signals P1 and P2 generated in the signal conversion unit 510 and the signal P5 generated in the signal rendering unit 520 and controls an image signal to be rendered on a display (S680).

The above-mentioned step S620 will be described in detail further with reference to FIGS. 7 through 10 illustrating the structure of four-color filters C1, C2, C3, and C4, according to a preferred embodiment of the present invention.

Figures 1, 2:
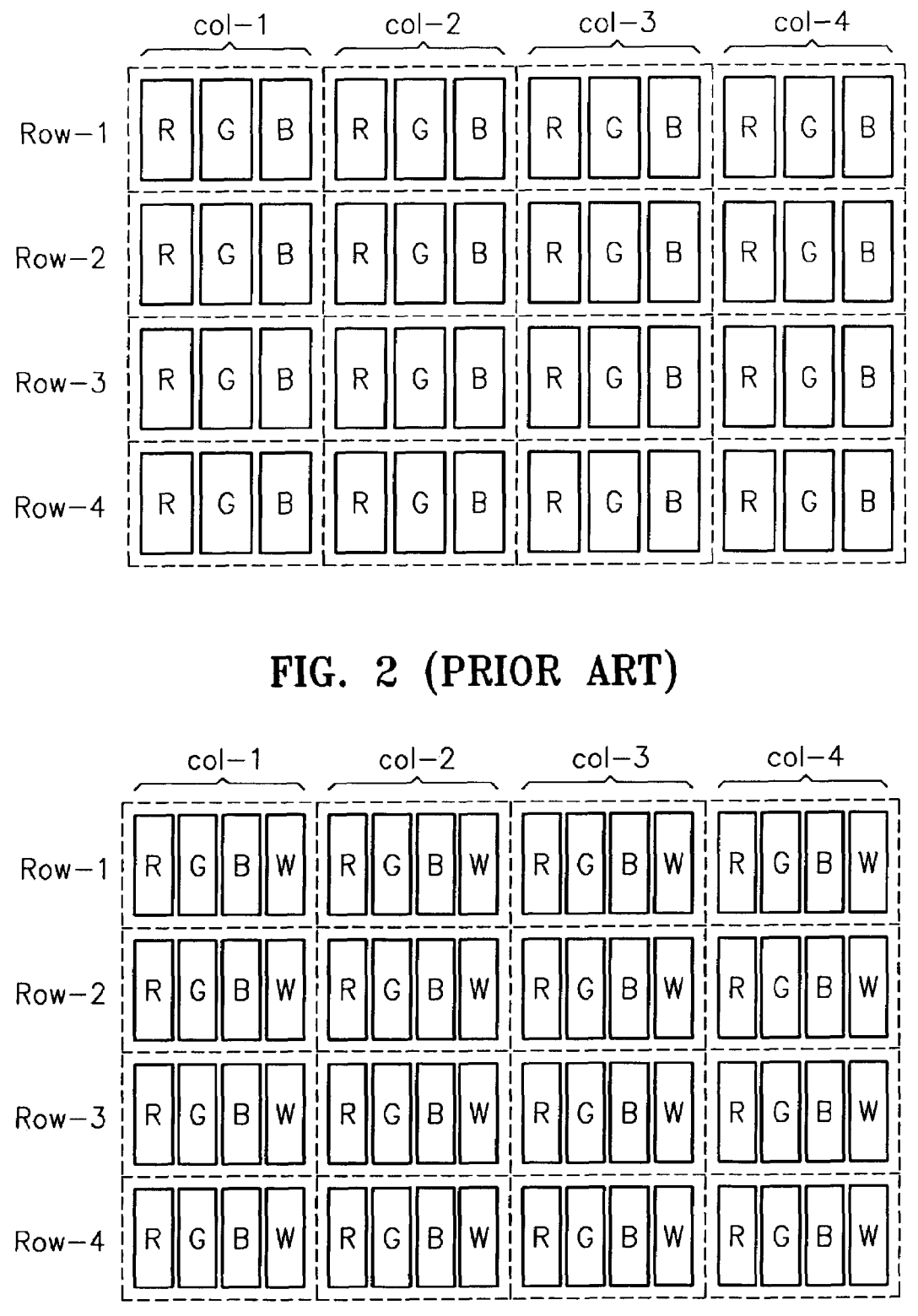

Each pixel shown in FIG. 7 has a total of three sub-pixels, like a pixel of a conventional apparatus for rendering an image signal shown in FIG. 1, and sub-pixels C3 and C4 exist in every other pixels. In the case of the filters comprising C1, C2, C3, and C4 as a sub-pixel shown in FIG. 7, a sub-pixel arrangement is made such that, in all rows, a pixel composed of the filters C1, C2, and C3 and a pixel composed of the filters C1, C2, and C4 are arranged alternately, and in each column, a pixel is composed of the same filters C1, C2, and C3 or a pixel is composed of the same filters C1, C2, and C4.

In the case of the filters comprising C1, C2, C3, and C4 shown in FIG. 8, as in the filters C1, C2, C3, and C4 shown in FIG. 7, a sub-pixel arrangement is made such that, in all rows, the pixel composed of the filters C1, C2, and C3, and the pixel composed of the filters C1, C2, and C4 are arranged alternately, and even in all columns, the pixel composed of the filters C1, C2, and C3, and the pixel composed of the filters C1, C2, and C4 are arranged alternately.

Meanwhile, in the case of the filters comprising C1, C2, C3, and C4 shown in FIG. 9, in an odd row, a pixel composed of the filters C1, C3, and C2 and a pixel composed of the filters C1, C4, and C2 are arranged alternately, and in an even row, a pixel composed of the filters C2, C4, and C1 and a pixel composed of the filters C2, C3, and C1 are arranged alternately, and in each column, a sub-pixel filters C3 and C4 is arranged alternately.

In FIG. 10, an odd row has a pixel composed of the filters C1, C3, and C2, and an even row has a pixel composed of the filters C2, C4, and C1. Thus, a pixel in each column has a sub-pixel filters C3 and C4 alternatively.

Like stated above, FIGS. 7 through 10 show examples of the structures of the filters C1, C2, and C3-C1, C2, and C4 of an C1, C2, C3, and C4 type apparatus for rendering an image signal in which a fourth sub-pixel is added to the filters C1, C2, and C3.

However, in the above method, when a color is rendered at a certain pixel, there is no certain sub-pixel (for example, a C3 channel), and thus, a color distortion occurs. Thus, for a correct color rendering, a method by which signals having C3 and C4 channels between sub-pixels of a pixel are properly adjusted and rendered to correspond to inputted image color signals is required.

That is, when four primary colors are used and a certain pixel is composed of three alternately-arranged sub-pixel pairs (for example, C1, C2, and C3, and C1, C2, and C4), a method by which a correct image is rendered by color matching performed according to positions of sub-pixels (for example, sub-pixels C3 and C4) having a relatively low spatial resolution is required. In the present invention, a level value of a signal to be rendered at sub-pixels C3 and C4 is recalculated using values of the sub-pixels C3 and C4 to be rendered at a peripheral pixel, thereby preventing a color distortion.

Hereinafter, the structure of the signal rendering unit 520 for rendering a signal and the step of recalculating signal values of sub-pixels C3 and C4 will be described with reference to FIGS. 5B, 5C, 6B, and FIGS. 6C through 6F.

Figure 5B:
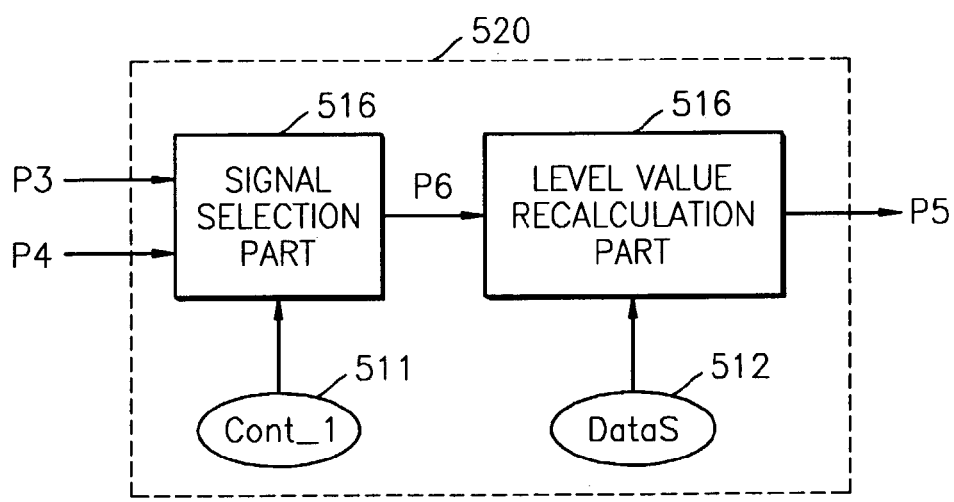
FIG. 5B is a block diagram illustrating the structure of a signal rendering unit 520 shown in FIG. 5A.
Figure 6B:
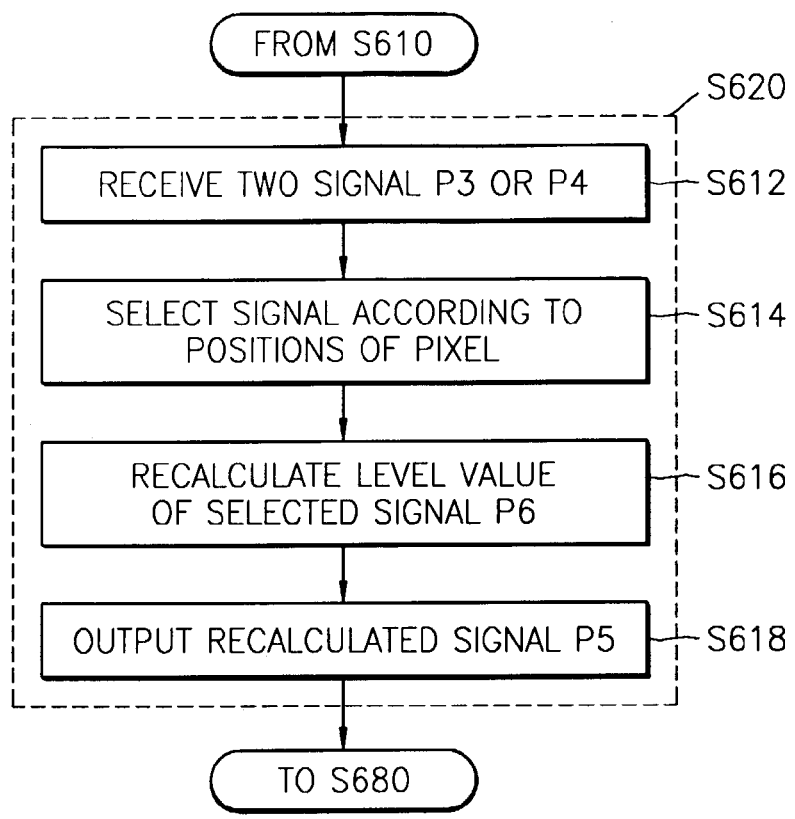
FIG. 6B is a detailed flowchart illustrating the step of recalculating a sub-pixel signal value performed in the signal rendering unit 520.

FIG. 5B is a block diagram illustrating the structure of the signal rendering unit 520 shown in FIG. 5A. The signal rendering unit 520 shown in FIG. 5B includes a signal selection part 515 and a level value recalculation part 516. FIG. 6B is a detailed flowchart illustrating the step of rendering signals of sub-pixels C3 and C4 performed by the signal rendering unit 520. Referring to FIGS. 5B and 6B, the signal selection part 515 receives the signals P3 and P4 among the four-color signals outputted from the signal conversion unit 510 (S612), and simultaneously, receives the signal Cont_1 511 which indicates an image coordinate of a corresponding signal, selects the type of a sub-pixel to be rendered at a corresponding position (for example, in the case of a sub-pixel comprising the filter C3, the signal P3) (S614), and outputs a corresponding signal P6 to the level value recalculation part 516. The level value recalculation unit 516 receives the selected signal P6, and simultaneously receives the data signal DataS 512 which indicates level values of a corresponding channel in the vicinity of a coordinate of a corresponding signal, calculates level values of sub-pixels to be rendered in an apparatus for rendering an image signal (S616), and outputs the signal P5 which is the result of calculation, to the display driver 530 (S618).

Figure 5C:
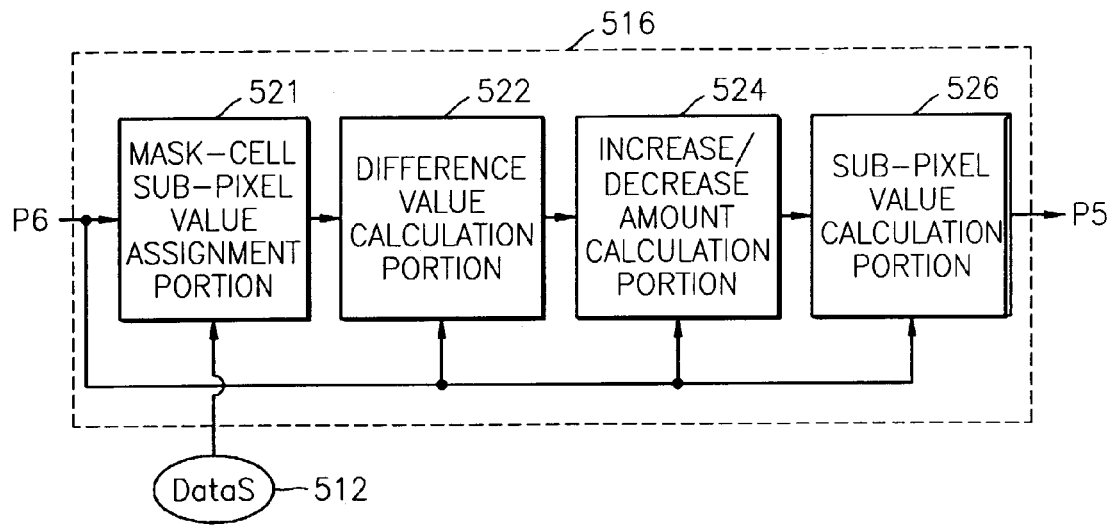
FIG. 5C is a block diagram illustrating the structure of a level value recalculation part 516 shown in FIG. 5B.

FIG. 5C is a block diagram illustrating the structure of the level value recalculation part 516 shown in FIG. 5B. The level value recalculation part 516 shown in FIG. 5C includes a mask-cell sub-pixel value assignment portion 521, a difference value calculation portion 522, an increase/decrease amount calculation portion 524, and a sub-pixel value calculation portion 526.

Figure 6C:
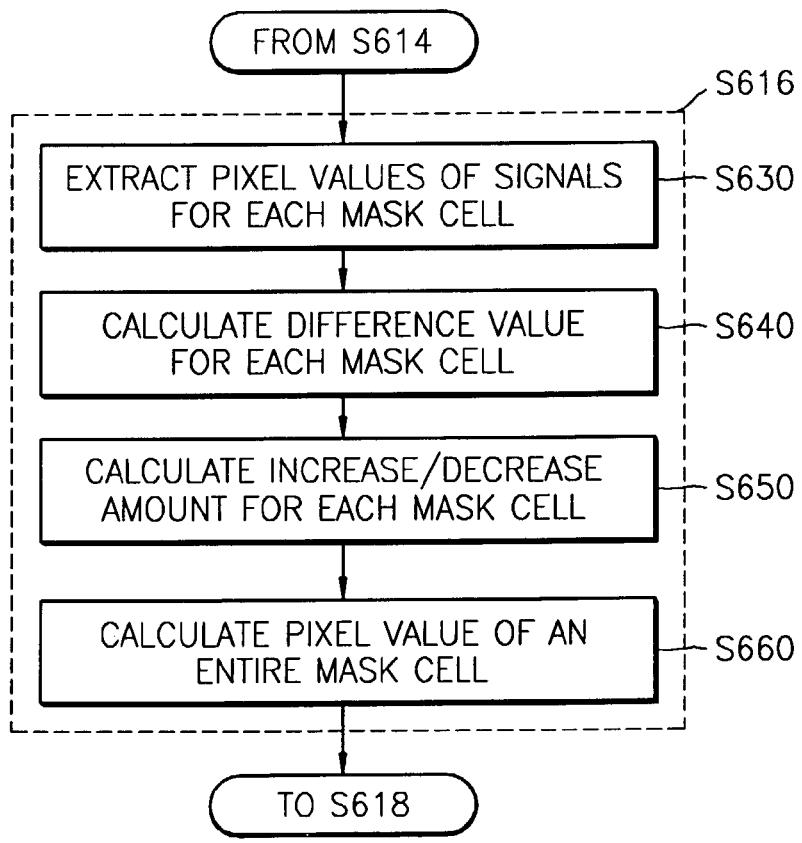

FIG. 6C is a flowchart illustrating the step of recalculating signal values of sub-pixels C3 and C4, performed by the level value recalculation part 516. Referring to FIG. 6C, the mask-cell sub-pixel value assignment portion 521 receives the signal P6 inputted from the signal selection part 515, and simultaneously, receives sub-pixel values of a corresponding channel in the vicinity of a coordinate of the signal P6 from the data signal DataS 512 in correspondence with a predetermined size of a mask, assigns sub-pixel values to each mask cell, and the difference value calculation portion 522 extracts signals of the corresponding channel (or sub-pixel) for each mask cell from signals inputted from the mask-cell sub-pixel value assignment portion 521 (S630).

The mask is used to calculate signal values of the filters C3 and C4 and is composed of a predetermined number of cells having a size corresponding to the size of each pixel of the apparatus for rendering an image signal.

Masks with a 3×3 area and a 5×5 area, are shown in FIGS. 11A and 11B. The masks may have sizes other than the sizes shown in FIGS. 11A and 11B, and it does not matter that the widths and heights of the masks are not the same. The sizes of the masks and weights for each area are determined according to a spatial arrangement of sub-pixels which are components of a pixel.

For example, in the case of FIG. 12, when a value of a sub-pixel C3 52 is calculated using a mask 62, peripheral pixels arranged above and below and right and left of a pixel having the sub-pixel 52 do not have a C3 channel. In the case of FIG. 13, when a value of a sub-pixel C3 53 is calculated using a mask 63, peripheral pixels arranged above and below a pixel having the sub-pixel 53 do not have the C3 channel, but right and left peripheral pixels have the C3 channel.

Figure 14:
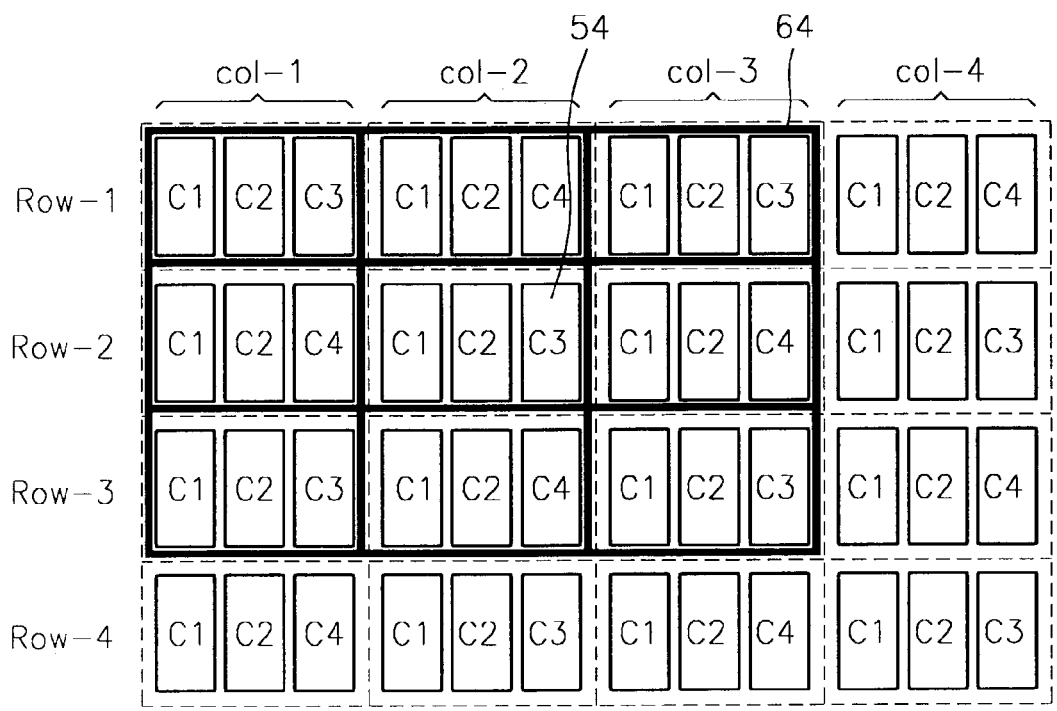
FIG. 14 shows an example in which the mask is adopted to the four-color (C1, C2, C3, and C4) filter structure shown in FIG. 8.
Figure 15:
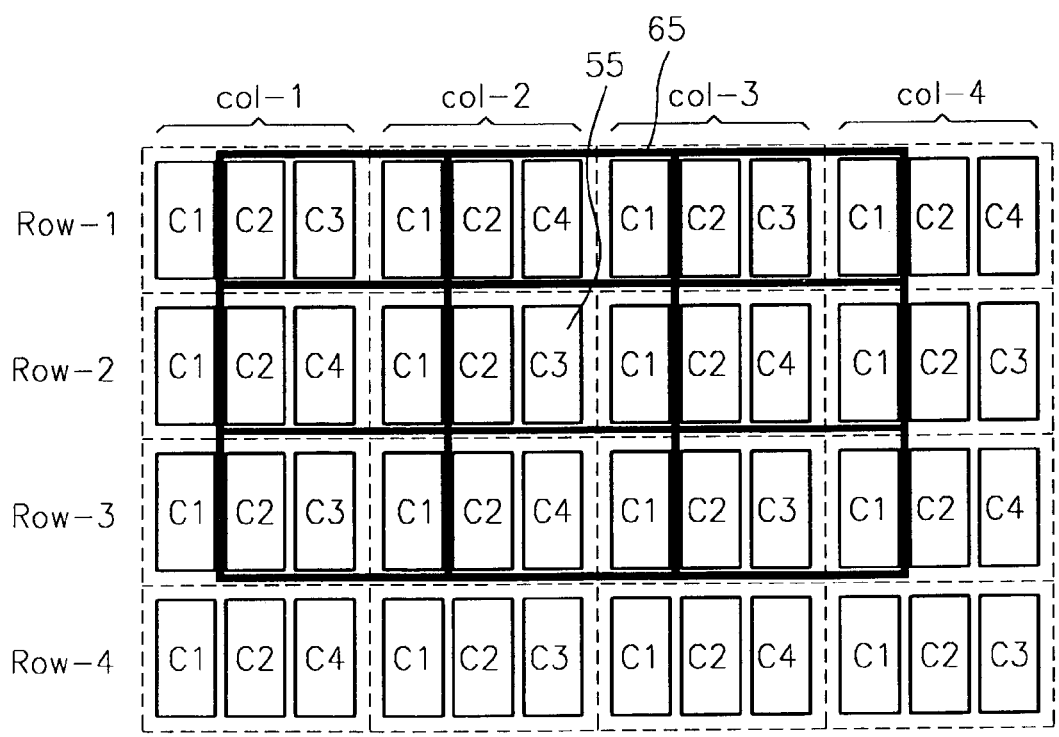
FIG. 15 shows another example in which the mask is adopted to the four-color (C1, C2, C3, and C4) filter structure shown in FIG. 8.

In the case of FIG. 14, when a value of a sub-pixel C3 54 is calculated using a mask 64, peripheral pixels arranged above and below and right and left of a pixel having the sub-pixel 54 do not have a C3 channel. In the case of FIG. 15, a filter arrangement is the same as that of FIG. 14, but a mask 65 is centered on a sub-pixel C3, and a mask cell can be calculated by an average value of overlapped areas.

Figure 12:
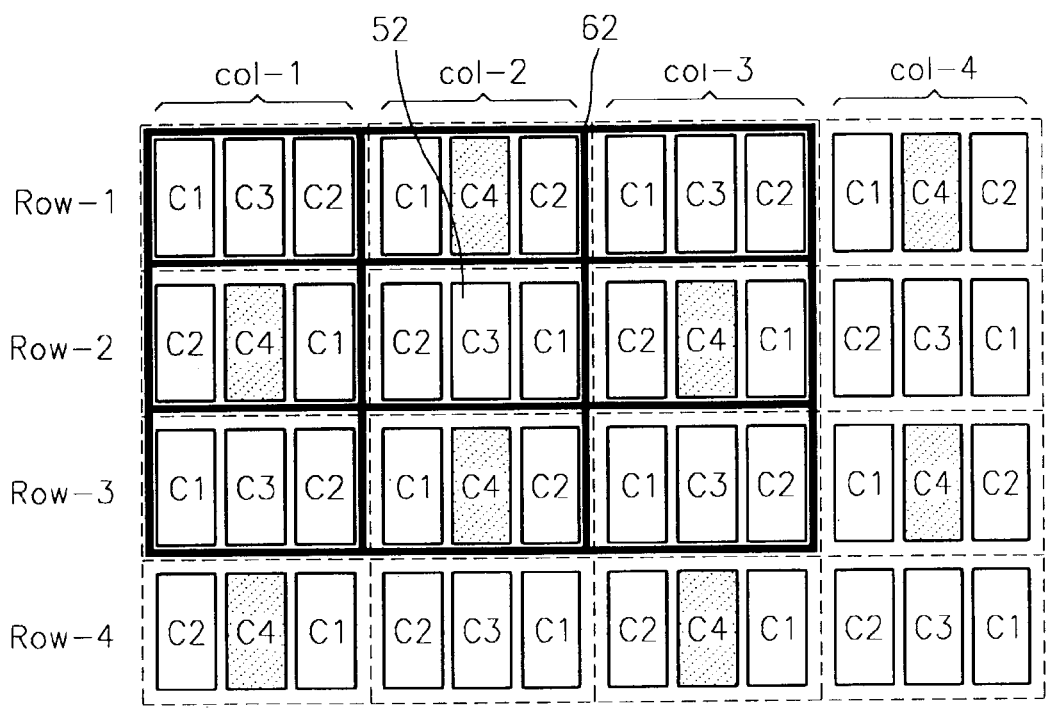
FIG. 12 shows an example in which the mask is adopted to the four-color (C1, C2, C3, and C4) filter structure shown in FIG. 9.
Figure 13:
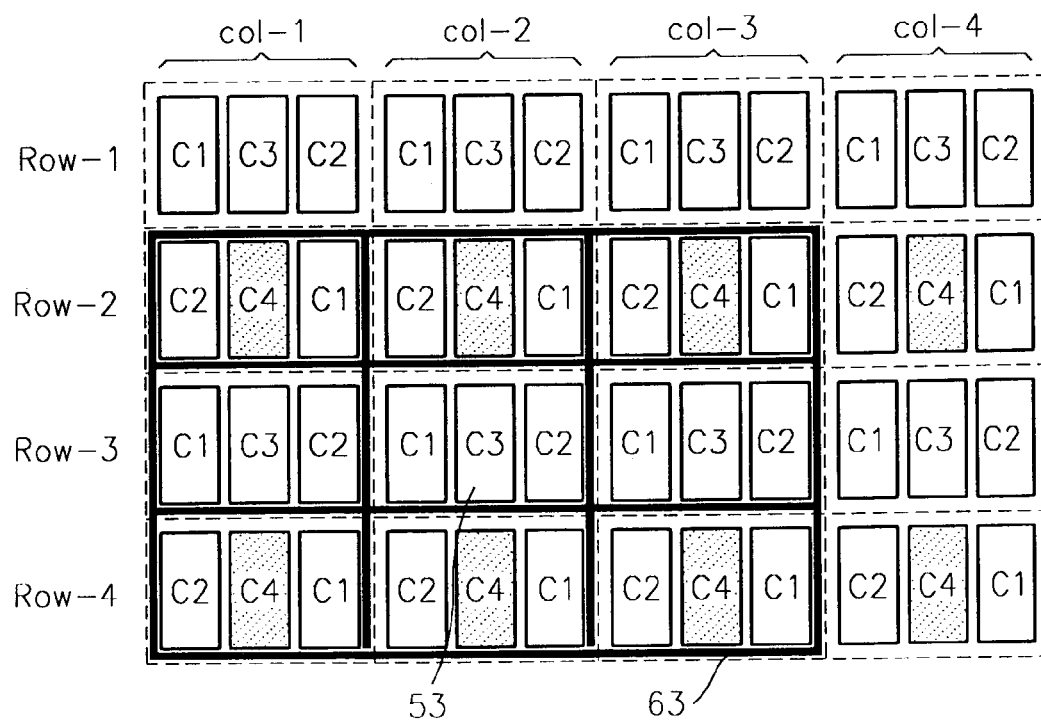
FIG. 13 shows an example in which the mask is adopted to the four-color (C1, C2, C3, and C4) filter structure shown in FIG. 10.

In the present embodiment, in the case of FIG. 12, a 0.5 weight is set to a center pixel, and a 0.125 weight is set to four peripheral pixels, respectively. In the case of FIG. 13, a 0.4 weight is set to a center pixel, and a 0.2 weight is set to up and down peripheral pixels, respectively, and a 0.1 weight is set to right and left peripheral pixels, respectively.

The difference value calculation portion 522 calculates a difference value between a value of the signal P6 in each area and a signal value of the same channel in a peripheral area for each mask cell using the determined mask (S640).

The increase/decrease amount calculation portion 524 receives the difference value of the value of the signal P6 for each mask cell from the difference value calculation portion 522 and calculates an increase/decrease amount for each mask cell according to a weight set to each mask cell (S650).

The sub-pixel value calculation portion 526 calculates a signal value to be rendered at each sub-pixel by adding the increase/decrease amount received from the increase/decrease amount calculation portion 524 to a pixel value for each mask cell and multiplying the added pixel value by a weight for each mask cell and outputs the calculated signal value to be rendered at each sub-pixel to the display driver 530 (S660).

Figure 6D:
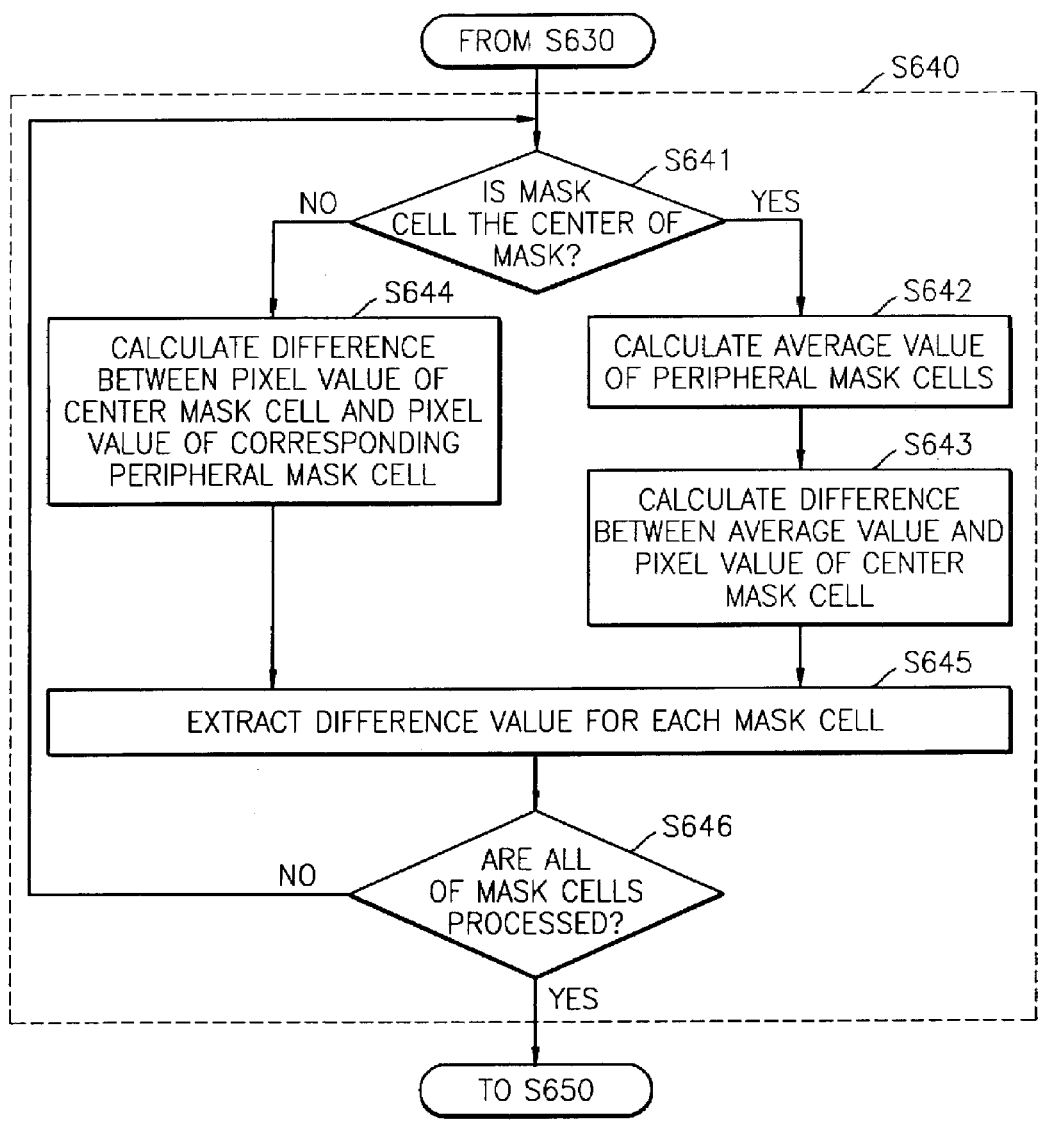

The above-mentioned step S640 will be described in detail with reference to FIG. 6D.

The difference value calculation portion 522 checks whether a mask cell in which the difference value will be calculated is the center of the mask (when the size of the mask is 3×3, a center becomes m22, and when the size of the mask is 5×5, a center becomes m33) (S641).

If the mask cell in which the difference value will be calculated is the center of the mask, an average value Neighbor_ave(i) of pixel values of a peripheral mask cell is obtained (S642). After that, a difference between the average value and a pixel value Mref(i) of a center mask cell is obtained as shown in equation 1, and a difference value Mdiff(i) for center mask cell is extracted (S643).

$$Mdiff(i)=\text{Neighbor\_ave}(i)-Mref(i) \quad (1)$$

If the mask cell is not the center of the mask, the difference value calculation portion 522 calculates a difference between a pixel value of the center mask cell and a pixel value of the corresponding peripheral mask cell (S644), and the difference value Mdiff(i) for each mask cell is extracted (S645).

The difference value calculation portion 522 checks whether difference values of all of mask cells are calculated, repeats the above-mentioned steps S641 through S645 until the difference values of all of the mask cells are calculated. Then, if the difference values of all of the mask cells are calculated, the difference value calculation portion 522 outputs the result of calculation to the increase/decrease amount calculation portion 524 (S646).

The above-mentioned step S650 will be described in detail with reference to FIG. 6E.

The increase/decrease amount calculation portion 524 which receives an image signal, calculates the size of an increase/decrease amount to be applied to a sub-pixel (S650) using the difference value which is spatial deviation information calculated in the above-mentioned step S640.

The increase/decrease amount calculation portion 524 multiplies the pixel value Mref(i) of the mask cell by the difference value Mdiff(i) of the corresponding mask cell with respect to each of inputted mask cells (S652). After that, the increase/decrease amount calculation portion 524 multiplies the multiplied value by a predetermined weight W2(i) and extracts an increase/decrease amount Minc(i) for each mask cell as shown in equation (S654).

$$Minc(i)=Mref(i) \times Mdiff(i) \times W2(i) \quad (2)$$

The increase/decrease amount calculation portion 524 checks whether increase/decrease amounts with respect to all mask cells are calculated and repeats the above steps S652 and S654 with respect to all of the mask cells (S656). Increase/decrease amounts calculated for all the mask cell are outputted to the sub-pixel value calculation portion 526.

The above-mentioned step S660 will be described in detail with reference to FIG. 6F.

The sub-pixel value calculation portion 526 receives a pixel value, an increase/decrease amount, and a weight of each mask cell from the increase/decrease amount calculation portion 524 and calculates a sub-pixel value (S660).

The sub-pixel value calculation portion 526 sets the sub-pixel value to 0 (S661) and adds the pixel value Mref(i) of each mask cell to the increase/decrease amount Minc(i) of the corresponding mask cell (S662).

After that, the sub-pixel value calculation portion 526 multiplies a weight W3(i) of the corresponding mask cell by the added value (S663) and accumulates the result of addition to the sub-pixel value (S664).

The sub-pixel value calculation portion 526 performs the above-mentioned steps S662 through S664 with respect to all of the mask cells and repeats the above-mentioned steps with respect to all sub-pixels of the apparatus for rendering an image signal moving the mask (S667).

The present invention proposes a method and apparatus for rendering an image signal in which the unbalance of colors outputted from each pixel is prevented using sub-pixel values of a peripheral pixel when a pixel is composed of three sub-pixels so that two primary colors among the four primary colors alternate with each other in the apparatus for rendering an image signal having four sub-pixels that can render four primary colors. Blue and white may be used as the two alternating primary colors C3 and C4, respectively. Also, a combination of two primary colors among the four primary colors such as red and white, green and white, red and blue, red and green, or green and blue, can be used as the two alternating primary colors C3 and C4. In addition, the alternating sub-pixel pair which are components of a pixel, can be changed depending on a certain position in a pixel area. That is, C3 and C4 (for example, blue and white) can be used as two alternating primary colors at a certain position, and C1 and C4 (for example, red and white) can be used as tow alternating primary colors at another position.

A method for rendering an image signal according to the present invention can also be embodied on computer readable recording media. The computer readable recording media include all types of recording devices in which data that can be read by a computer system are stored, such as ROMs, RAMs, CD-ROMs, magnetic tapes, floppy discs, optical data storage units, and carrier waves (for example, transmission via the Internet). Also, the computer readable recording media are distributed over a network-connected computer system and can be stored and executed by a computer readable code.

As described above, in a method and apparatus for rendering an image signal, the unbalance of colors outputted from each pixel is prevented using sub-pixel values of a peripheral pixel when a pixel is composed of three sub-pixels so that two primary colors among the four primary colors alternate with each other in the apparatus for rendering an image signal having four sub-pixels that can render four primary colors.

In the method and apparatus for rendering an image signal according to the present invention, the number of driver ICs is the same as the number of driver ICs of a conventional RGB rendering apparatus, and one primary color is added to three RGB primary colors such that a color rendering range can be enlarged or luminance can be improved while a color distortion does not occur.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for rendering image signals which represent a predetermined number of colors in an apparatus for rendering an image signal of which pixels have three sub-pixels, the method comprising:
    (a) receiving a predetermined number of color signals and converting the predetermined number of color signals into four-color signals to be represented in the sub-pixels;
    (b) selecting two-color signals to be outputted alternatively in every other pixels out of the four-color signals and selecting only one-color signal for each position of a pixel area from the two-color signal;
    (c) recalculating a level value of the selected one-color signal to be represented in the sub-pixels; and
    (d) controlling image signals to be represented in the sub-pixels according to the level value of the one-color signal calculated in (c)
    (e) outputting the rendered image signals to be displayed.

2. The method of claim 1, wherein in (c), the level value of the one-color signal selected in (b) is calculated according to peripheral sub-pixel values using a mask having a size corresponding to the size of each pixel of the apparatus for rendering an image signal and composed of a predetermined number of cells.

3. The method of claim 2, wherein the level value of the one-color signal is calculated by calculating an increase/decrease amount of a pixel value according to a pixel value and a difference value of a mask cell corresponding to each pixel of the apparatus for rendering an image signal.

4. The method of claim 3, wherein when a mask cell in which the difference value will be calculated is the center of the mask, the difference value is a difference between an average value of pixel values of a peripheral mask cell and a pixel value of a center mask cell.

5. The method of claim 3, wherein when the mask cell in which the difference value will be calculated is not the center of the mask, the difference value is a difference between the pixel value of the center mask cell and a pixel value of the mask cell in which the difference value will be calculated.

6. The method of claim 3, wherein the increase/decrease amount of the pixel value is calculated by multiplying the pixel value and difference value of the mask cell corresponding to each pixel of the apparatus for rendering an image signal by each other and multiplying the result of multiplication by a predetermined weight.

7. The method of claim 2, wherein in (c), a level value to be rendered in the apparatus for rendering an image signal is calculated by adding the pixel value and the increase/decrease amount for each mask cell to each other and multiplying the result of addition by a predetermined weight.

8. The method of claim 1, wherein (c) comprises:
(c1) calculating a difference value for each mask cell;
(c2) calculating an increase/decrease amount of a pixel value using a pixel value and a difference value for each mask cell; and
(c3) calculating a pixel value of an entire mask cell using the pixel value for each mask and the increase/decrease amount of the pixel value for each mask cell.

9. The method of claim 8, wherein (c1) comprises:
determining whether a mask cell in which the difference value will be calculated is the center of the mask;
if the mask cell in which the difference value will be calculated is the center of the mask, calculating an average value of pixel values of a peripheral mask cell;
if the mask cell is not the center of the mask, setting a pixel value of a center mask cell to the average value; and
calculating a difference between a pixel value of the mask cell in which the difference value will be calculated and the average value.

10. The method of claim 8, wherein (c2) comprises:
multiplying the pixel value and the difference value for each mask cell by each other; and
multiplying the multiplied value by a weight to calculate an increase/decrease amount of the pixel value for each mask cell.

11. The method of claim 8, wherein (c3) comprises:
adding the pixel value and the increase/decrease amount of the pixel value for each mask cell to each other;
multiplying the added value by a weight for each mask cell; and
accumulating the multiplied value to a pixel for each mask cell to calculate a sub-pixel value.

12. The method of claim 1, wherein the two-color signal selected in (b) includes blue and white.

13. The method of claim 1, wherein the two-color signal selected in (b) includes red and white.

14. The method of claim 1, wherein the two-color signal selected in (b) includes green and white.

15. The method of claim 1, wherein the two-color signal selected in (b) includes red and green.

16. The method of claim 1, wherein the type of the two-color signal selected in (b) is varied according to positions of a pixel area.

17. A computer readable recording medium where the method for rendering an image signal of claim 1, is recorded as an executable program code.

18. An apparatus for rendering an image signal of which pixels have three sub-pixels, the apparatus comprising:
a signal conversion unit to receive a predetermined number of color signals and convert the predetermined number of color signals into four-color signals;
a signal selection unit to select two-color signals to be outputted alternatively in every other pixels out of the four-color signals and select only one-color signal for each position of a pixel area from the two-color signal;
a level value recalculation unit to recalculate a level value of the selected one-color signal to be represented in the sub-pixels; and
a display driver to control image signals to be represented in the sub-pixels according to sub-pixel values received from the level value recalculation unit.

19. The apparatus of claim 18, wherein the level value recalculation unit calculates each sub-pixel value to represent the one-color signal received form the signal selection unit according to peripheral sub-pixel values using a mask having a size corresponding to the size of each pixel and composed of a predetermined number of cells.

20. The apparatus of claim 18, wherein the level value recalculation unit comprises:
a difference value calculation part to calculate a difference value for each mask cell;
an increase/decrease calculation part to calculate an increase/decrease amount of a pixel value using the pixel value and the difference value for each mask cell; and
a sub-pixel value calculation part to calculate a sub-pixel value of an entire mask cell using the pixel value for each mask cell and the increase/decrease amount of the pixel value for each mask cell.

21. The apparatus of claim 20, wherein the difference value calculation part, when a mask cell in which the difference value will be calculated is not the center of the mask, calculates a difference between a pixel value of a center mask cell and the pixel value of the mask cell in which the difference value will be calculated, and when the mask cell is the center of the mask, calculates a difference between an average value of pixel values of a peripheral mask cell and the pixel value of the center mask cell.

22. The apparatus of claim 20, wherein the increase/decrease amount calculation part calculates the increase/decrease amount of the pixel value by multiplying the pixel value and difference value of the mask cell corresponding to each pixel by each other and multiplying the result of multiplication by a predetermined weight.

23. The apparatus of claim 20, wherein the sub-pixel value calculation part calculates a sub-pixel value to be represented by adding the pixel value and the increase/decrease amount for each mask cell to each other and multiplying the result of addition by a predetermined weight.

24. The apparatus of claim 18, wherein the two-color signal selected by the signal selection unit includes blue and white.

25. The apparatus of claim 18, wherein the two-color signal selected by the signal selection unit includes red and white.

26. The apparatus of claim 18, wherein the two-color signal selected by the signal selection unit includes green and white.

27. The apparatus of claim 18, wherein the two-color signal selected by the signal selection unit includes red and green.

28. The apparatus of claim 18, wherein the type of the two-color signal selected by the signal selection unit is varied according to positions of a pixel area.

* * * * *